United States Patent [19]

Daniels

[11] Patent Number: 4,957,516
[45] Date of Patent: * Sep. 18, 1990

[54] INVERSE FLOW DEPTH FILTER ASSEMBLY

[75] Inventor: Keith L. Daniels, Birdsboro, Pa.

[73] Assignee: Reading Technologies, Inc., Reading, Pa.

[ * ] Notice: The portion of the term of this patent subsequent to Apr. 18, 2006 has been disclaimed.

[21] Appl. No.: 310,729

[22] Filed: Feb. 14, 1989

Related U.S. Application Data

[63] Continuation-in-part of Ser. No. 112,256, Oct. 22, 1987, Pat. No. 4,822,387.

[51] Int. Cl.$^5$ .............................................. B01D 46/00
[52] U.S. Cl. ........................................ 55/218; 55/323; 55/337; 55/267
[58] Field of Search ................. 55/267, 268, 269, 323, 55/337, 218

[56] References Cited

U.S. PATENT DOCUMENTS

| | | | |
|---|---|---|---|
| 3,876,400 | 4/1975 | Frantz | 55/267 |
| 3,890,122 | 6/1975 | Frantz | 55/218 |
| 4,052,178 | 10/1977 | Frantz | 55/218 |
| 4,487,618 | 12/1984 | Mann | 55/323 |
| 4,692,175 | 9/1987 | Frantz | 55/218 |
| 4,713,094 | 12/1987 | Yanagawa et al. | 55/218 |
| 4,764,189 | 8/1988 | Yanagawa | 55/316 |
| 4,822,387 | 4/1989 | Daniels | 55/323 |

*Primary Examiner*—Bernard Nozick
*Attorney, Agent, or Firm*—Steele, Gould & Fried

[57] ABSTRACT

An inverse flow depth filter assembly includes an elongated, generally elliptical housing with gas inlet and egress means, and a bottom drain. A filter cartridge is suspended from the housing top so that an annular channel is created between the housing and the cartridge. The cartridge has passages at the top, leading to the egress means and an open bottom. Air enters the housing and is channeled downward through the annular channel until it reaches the cartridge bottom, quiets the turns upwardly through the filter. Heat exchange apparatus cools the down-flowing air and promotes condensation of the water. The heat exchange apparatus can include a plurality of fins fixed to the exterior of the housing to promote heat exchange with the surrounding atmosphere. Heat exchange fins disposed internally at the annular channel promote heat exchange between the flowing air and the housing. The fins increase the contact surface area for better heat exchange with the outside air. The at least one, preferably helical fin extends partway into the annular channel, improving surface contact without substantialy resistance to air flow.

25 Claims, 5 Drawing Sheets

INVERSE FLOW DEPTH FILTER ASSEMBLY

CROSS-REFERENCE TO RELATED APPLICATIONS

This application is a continuation-in-part of co-pending U.S. Pat. application Ser. No. 112,256, filed Oct. 22, 1987, now U.S. Pat. No. 4,822,387.

BACKGROUND OF THE INVENTION

1. Field of the Invention

This invention relates generally to gas and liquid contact apparatus and, in particular, to devices for collecting and removing liquids from flowing gases.

2. Description of the Prior Art

There are many devices in use which filter liquids and solid particles from air as it passes through air lines. Some devices rely on the use of various filtering elements to collect and remove liquid droplets and solid particulates, while others rely on the pattern and velocity of the air as it passes through the lines. Examples of the latter are U.S. Pat. No. 2,168,512 to Browning and U.S. Pat. No. 845,807 to Miller. Browning shows an air line trap with air flowing through baffles so that condensates are expected to collect at the bottom of the trap. Miller shows a water separator which directs air downward with baffles. Neither of the aforementioned use filter elements or address the necessary pattern of air flow necessary to achieve the quickest and most efficient filtering through filter elements.

U.S. Pat. No. 3,791,105 to Rhodes shows oil filtering to remove fluid and oil in a two-stage device. The fluid is removed in the upper stage and oil drains out the bottom of the lower stage.

U.S. Pat. No. 2,204,017 to Kehle uses the velocity of the air through baffles to cause droplets to fall and drain from a lower chamber.

Mann, in both U.S. Pat. No. 4,600,416 and U.S. Pat. No. 4,487,618, discloses an air line vapor trap for removing water and/or oil vapor from a compressed air line. The trap uses two cartridges, one with a wire fiber pad and the other with spirally wound fiber. A base plate includes parallel louvers to collect condensates. There is a drain at the bottom of one of the cartridges for removal of condensates and debris. The air flows down one cartridge and up the other cartridge.

It is important in the fluid power industry, in particular with compressed air systems, to achieve efficient filtration without loss of pressure because pressure loss will affect operation of the equipment and may even cause equipment failure.

It is especially desirable to remove moisture from pneumatic systems such as those used in the brake systems of large trucks and other motor vehicles. The pneumatic systems are typically used as a means to release the brakes. Water present in the pneumatic line may freeze, which may cause dangerous impairments to the function of the brakes.

None of the aforementioned prior art discloses a filtering system and equipment which forces air into a pattern which most efficiently utilizes the filtering elements and still maintains high pressure levels. None of the prior art provides a separate cartridge for containing the filter element inside the filter housing, the separate cartridge forming a channel with the housing to direct the air flow vertically upward through all filter elements. None of the prior art additionally discloses the provision of heat exchange apparatus in such a device.

SUMMARY OF THE INVENTION

The aforementioned prior art problems are obviated by the inverse flow depth filter assembly of this invention. A housing is elongated and preferably elliptical with exterior and interior surfaces, and preferably includes top and bottom portions. The top preferably includes both gas inlet means and gas egress means, and the bottom of the housing includes drain means. A generally hollow, tubular filter cartridge, with a generally closed top and opened bottom, hangs from the top underside of the housing so that an annular channel is created between the housing and the cartridge. The cartridge top includes gas egress means which lead into the gas egress means in the housing. Gas under pressure enters the housing through the gas inlet means and flows downward into the annular channel. The gas is channeled upward through the cartridge bottom into the filter, to exit at the cartridge top through the gas egress means.

Heat exchange means can be provided interior to the housing in communication with the annular space between the housing and the cartridge, and can also be provided exterior to the housing. The heat exchange means are adapted to cool the air and thereby to promote condensation of water prior to entry of the air into the filter cartridge. Heat exchange means interior to the housing preferably includes at least one fin extending inwardly from the housing to contact system air flowing through the annular space. Heat exchange means exterior to the housing includes at least one, and preferably a plurality of fins extending outwardly from the housing to contact ambient air. The at least one fin within the annular space is preferably formed in a helical arrangement so as to maximize the length of the flow path of air through the annular space, to promote contact with the fins and heat exchange without a substantial resistance to flow.

It has been proven by testing that filter elements are most efficient when air flows through them in an upward pattern. Water will accumulate and flow downward through the filter element under the influence of gravity, and therefore air flowing upward through the filter element and exiting apparatus will not re-entrain water in the filter. Air leaving the filter element will thereby be thoroughly dehydrated prior to exit from the apparatus. Such an apparatus was described in Applicant's co-pending U.S. Pat. application Ser. No. 112,256 filed Oct. 22, 1987 now U.S. Pat. No. 4,822,387, the disclosure of which is hereby incorporated fully by reference. It has now been discovered that the beneficial effects there described are even further realized with the provision of heat exchange means for the airstream flowing through the annular space. Heat exchange will condense some water from the air prior to entry into the filter element, thereby reducing the loading on the filter element and increasing the efficiency of filtration.

It is, therefore, an object of this invention to provide an inverse flow depth filter assembly for pressurized gaseous systems in which a cartridge is provided to house the filter elements.

It is another object of this invention to provide an inverse flow depth filter assembly for pressurized air systems in which the air flow is directed upwards for greatest filter efficiency.

It is still another object of this invention to provide an inverse flow depth filter assembly for pressurized gaseous systems in which the housing and a cartridge with an impermeable wall form a channel directing gas flow.

It is yet another object of this invention to provide an inverse flow depth filter assembly for pressurized gaseous systems which will reduce the water loading of the air stream entering the filter elements.

It is a further object of this invention to provide an inverse flow depth filter assembly which houses two dissimilar filters in a single cartridge.

These and other objects will be more readily ascertainable to one skilled in the art from a consideration of the following figures, description and exemplary embodiments.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

Figure 1:
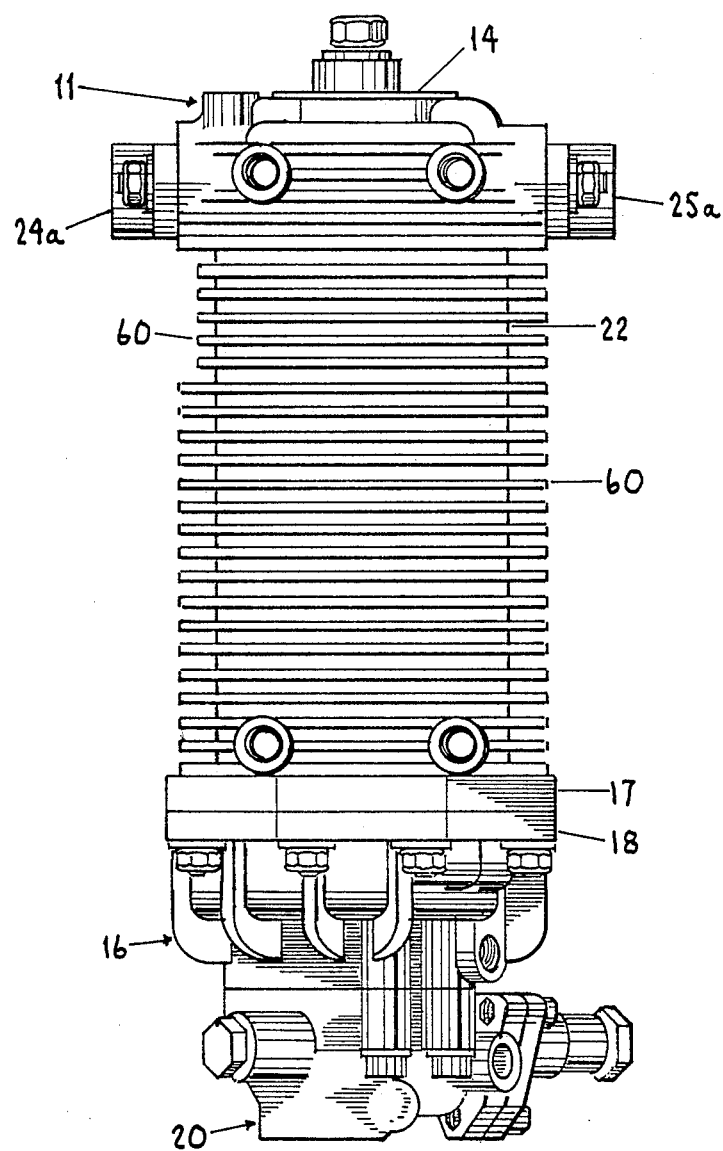
FIG. 1 is a side elevation of an inverse flow depth filter the invention.
Figure 2:
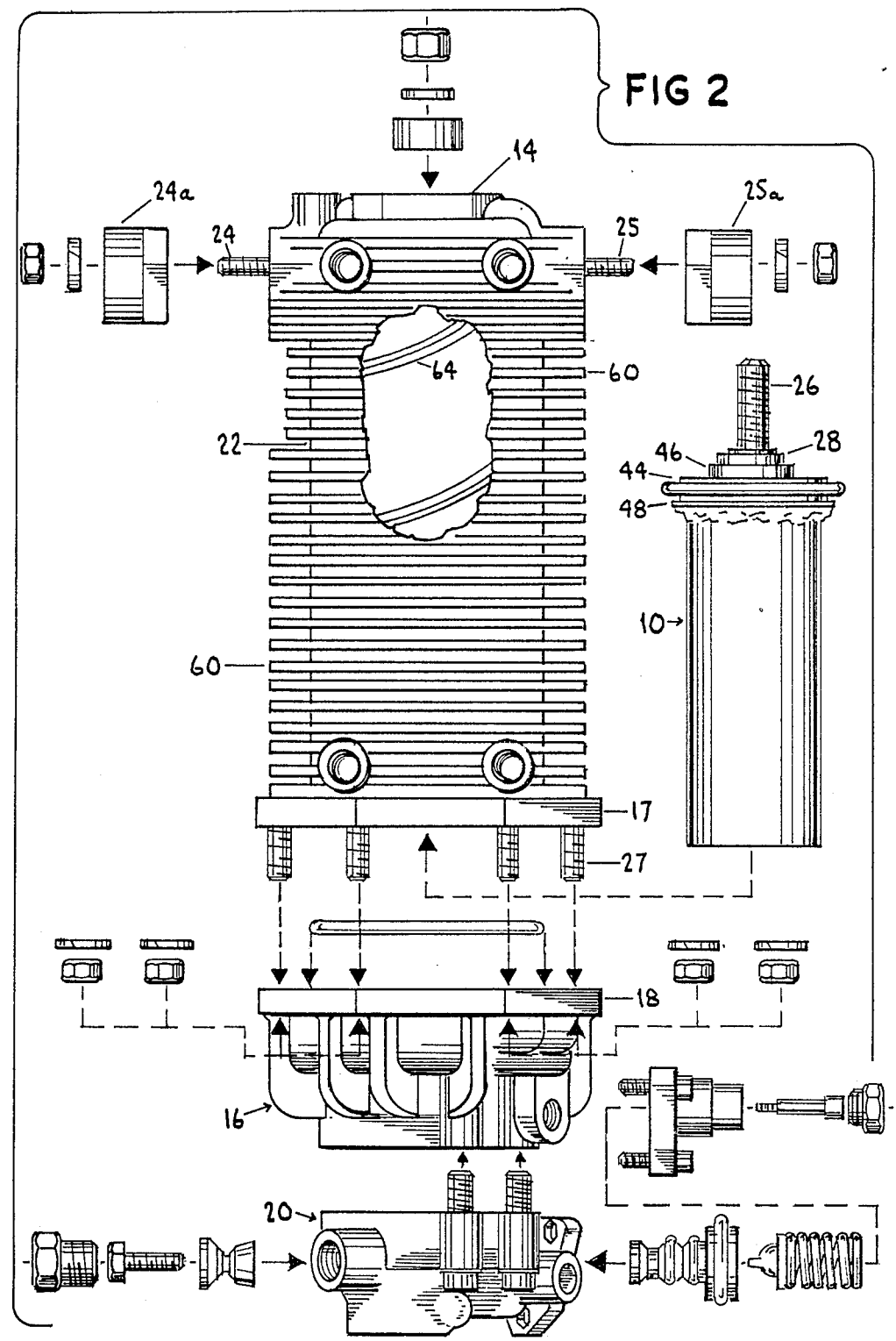
FIG. 2 is an exploded side elevation, partially broken away to depict internal features of a first embodiment with a permanently-installed filter cartridge.

The inverse flow depth filter assembly of this invention is especially useful in pneumatic systems, and particularly to filter pressurized air in the pneumatic systems found in large trucks and other vehicles. However, other systems using other gases may similarly benefit from the inverse flow depth filter assembly of this invention. Therefore, when the term "air" is used, the term is meant to encompass in principle all suitable gases, and it is anticipated that the following description will be applicable to systems other than the pneumatic systems found in large motor vehicles.

Aspects of the invention have been previously disclosed in Applicant's copending U.S. Pat. application Ser. No. 112,256 now U.S. Pat. No. 4,822,387, the disclosure of which is fully incorporated herein by reference. Referring now to the drawings, particularly FIGS. 1–4, an inverse flow depth filter assembly 11 according to the invention is shown. The assembly 11 includes a housing and a filter cartridge 10. The housing preferably includes a housing top 14 and a housing bottom 16. The housing top 14 includes gas inlet means 24 and gas egress means 25, preferably having couplings 24a and 25a, respectively, adapted to engage system hosing or piping. Housing top 14 also includes a collar formed by walls 21 and 23, which surround a pin 26. Pin 26 is threaded at both ends, the first threaded end securing pin 26 to a top cap 15 of housing top 14, the second end threaded into a threaded central aperture 40 of cartridge 10, thereby providing means to suspend cartridge 10 inside the housing.

The housing bottom 16 includes drain opening 9. The drain opening 9 can be controlled by an automatic drain 20. The housing top 14 can be provided with a flange 17 at a lower end thereof. The housing bottom 16 can be provided with a flange 18 at an upper end such that the respective flanges 17 and 18 can be joined together by suitable fastening means such as bolts 27, which extend downwardly from the flange 17 into suitable openings in flange 18, where suitable means such as nuts can be used to secure the housing top 14 to the housing bottom 16.

The housing top 14 includes an elongated annular side wall 22. The side wall 22 substantially surrounds the filter cartridge 10, and is spaced apart therefrom so as to leave an annular channel 19.

Figure 4:
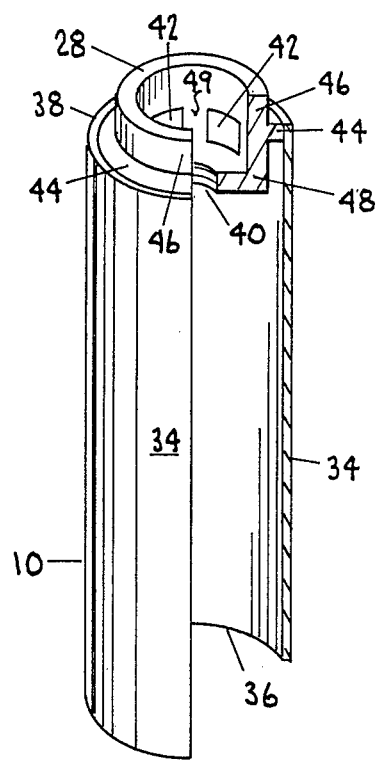
FIG. 4 is a perspective view with a partial cutaway illustrating an alternative embodiment of the invention with a replaceable/throwaway filter cartridge.

The filter cartridge 10 has an annular side wall 34, open bottom 36, top 38, and plug 28 to generally close cartridge top 38 (FIG. 4). The cartridge 10 can be constructed of polycarbonate or other durable plastic, as in the embodiment shown in FIG. 4, whereby providing a removable/throwaway cartridge that can be conveniently replaced when accumulation of solids and the like result in an undue pressure drop across the device. A more durable cartridge can also be employed, e.g., of metal as in the embodiment of FIG. 2. The more durable cartridge is not intended to be discarded. In that embodiment only the filter material contained in the cartridge is replaced as necessary. An aluminum alloy or other durable metal or plastic materials which are not easily damaged by high velocity air are possible. The invention is discussed herein primarily with reference to the removable/throwaway cartridge embodiment as shown in FIG. 4. However, the same considerations also apply for the most part to the more-permanent cartridge embodiment of FIG. 2. The specifics of mounting structure, e.g., the pin 26, etc., vary slightly between the two embodiments. The embodiments are quite similar with respect to the air flow paths defined by the cartridge housings and the external casing of the device. For example, the top bolt on the throwaway embodiment is a permanent part of the external housing, threadable through the top of the filter cartridge. The top bolt on the permanent filter cartridge embodiment is fixed (e.g., welded) to the top of the cartridge. Nevertheless the embodiments employ the same configuration of air flow paths, and both enjoy the benefits of the invention.

Plug 28 is preferably tri-level with raised collar 46, lip 44, and base 48. Base 48, collar 46 and lip 44 are preferably one unit of polycarbonate. Lip 44 is preferably sealed to the inner edge of cartridge wall 34 at top 38. Raised collar 46 is sized to form a seal with the collar formed by wall sections 21 and 23 when pin 26 is threaded into pin receiving means 40.

Base 48 includes pin receiving means 40 and extends to uprights 49 to form air egress ports 42 therebetween. As air passes upward through filter cartridge 10, it exits through ports 42 and enters channel 45 to exit housing through gas egress means 25. Plug 28 is preferred to other plug configurations because it allows even air flow through filter cartridge 10.

Figure 3:
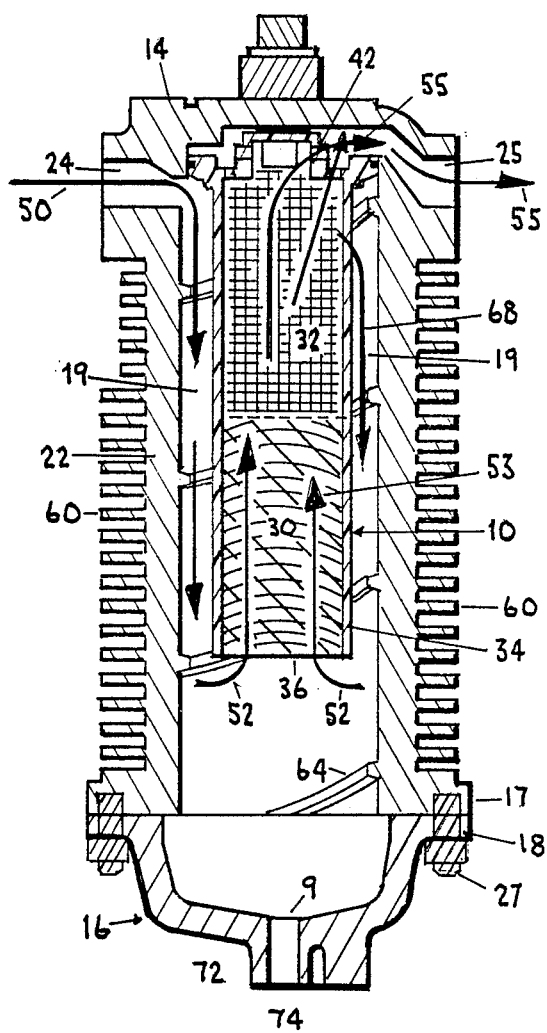
FIG. 3 is a vertical cross-section through the filter assembly.

Shown inside cartridge 10 in FIG. 3 are two filter elements of dissimilar materials, namely filter elements 30 and 32. Filter element 30 is preferably tightly packed metal wire twist, for example stainless steel, aluminum, copper, etc., and filter element 32 is preferably cotton/metal wire mesh or knit, both conventional filter media. In some applications, the two elements advantageously can be the same material. For example where the filter cartridge will not be replaced for a long time, a filter wherein both parts are filled with coalescent material is appropriate. As air passes through cartridge 10, water vapor travels more slowly because of its greater weight. It collects on the filter element, and eventually coalesces and drops to housing bottom 16 to be drained out through drain 9.

It has been discovered that it is critical for greatest filter efficiency for air to travel vertically upward through the fiber mesh and twist filters. By running the entrained vapor vertically upward, the vapor coalesces on the wire and is briefly held there. As more and more entrainment water is collected on the wire, the mass of the droplet becomes great enough to fall freely back against the upward vapor flow and drain out drain 9. It is important not to run entrained vapor vertically downward in a filter system unless there are other vapor traps or filters further downstream. When flowing in a downward direction, vapor re-entrains coalesced liquid from the bottom of the filter and thus considerably reduces the overall efficiency of the filter. In order to overcome that problem and assure that the air is channeled in an upward vertical direction so that droplets fall in an opposite direction to the air flow, and are therefore not re-entrained by the air flow, cartridge 10 is provided. Cartridge 10 prohibits air and vapor from entering filter elements 30 and 32 when the air is travelling downward. Air enters filter elements 30 and 32 only through open filter cartridge bottom 36 and it then flows upward for greatest filter efficiency.

Air enters the housing through air inlet means 24 and inlet channel in the direction of arrow 50. Air is then forced downward into annular channel 19 and flows to the open filter cartridge bottom 36. When air reaches cartridge bottom 36, it is allowed to enter cartridge 10 in the direction of arrows 52. Air then flows upward in the direction of arrows 53, passing through filter elements 30 and 32. Air passes out of cartridge 10 through ports 42 and outlet channel 45, in the direction of arrows 55, to exit through gas egress means 25.

It is now been discovered that the filtration produced particularly by an inverse flow depth filter assembly as heretofore described is enhanced by the provision of heat exchange means for cooling the air as it passes from the gas inlet means 24 to the cartridge bottom 36. The lowering of the temperature of the inlet air stream will condense a substantial amount of water from the moving air stream, which collects in the housing bottom 16 of the assembly.

A preferred heat exchange means comprises one or more heat exchange surfaces such as fins which extend from the housing side wall 22. A plurality of exterior fins 60 can extend outwardly from an exterior surface of the side wall 22 to promote heat exchange between the housing and the ambient air. Heat exchange with air flowing through the annular space 19 can be promoted by the provision of one or more internal fins 64 which extend inwardly from the side wall 22.

The precise number and dimensions of the exterior fins 60 and the interior fins 64, and the nature of their attachment to the side wall 22, can be varied. It is, of course, necessary that the fins be constructed of a material which will effectively conduct heat through the side wall 22 and distribute the heat to the surrounding atmosphere or other heat sink.

It is currently preferred to provide the interior fins 64 as a substantially continuous, helically wound fin. The air entering through the gas inlet means 24 will be caused to spiral through the annular space as depicted by the arrows 68 (FIG. 3). Such a flow pattern will provide a large heat transfer area for contact with the air, while allowing the air to flow smoothly from the gas inlet means 24 to the cartridge bottom 36. The dimension of the helical fin 64 can be varied, but preferably has a width that is substantially less than the cross-sectional width of the annular space 19. Flow through the annular space will thereby be substantially unimpaired Water collecting at the drain valve at the bottom of the housing may freeze in cold weather, and foul the valve or block the outlet. The air stream temperature and pressure normally prevent freezing in the bowl itself. To protect the drain and the valve it is desirable to provide a heating means 72 to heat water outside the airstream at the area of the valve and to thereby prevent such freezing and blockage. The heating device 72 can be of conventional design, and can receive power from an inlet power line 74 that is connected to a suitable power source such as the electrical circuitry of the motor vehicle.

Figure 5:
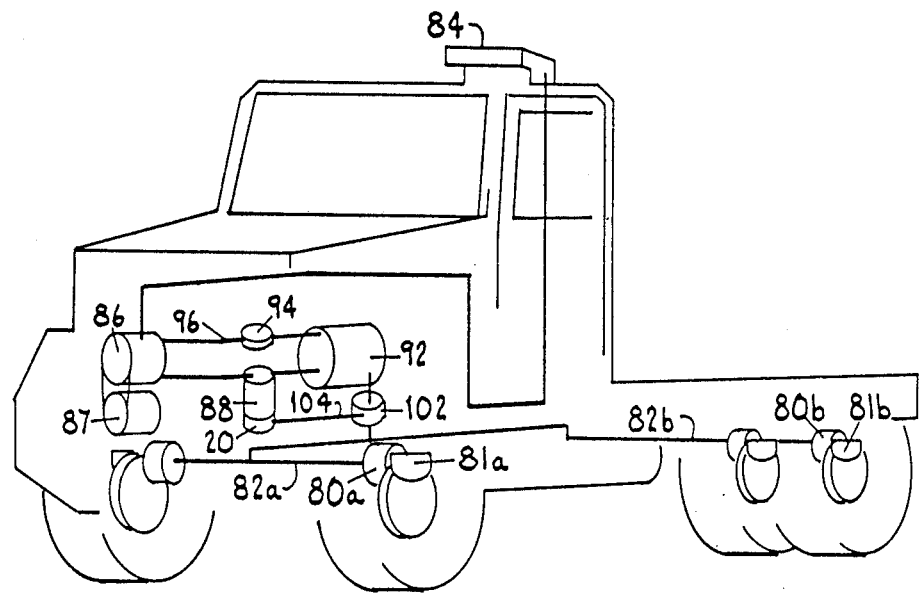
FIG. 5 is a schematic depiction of an inverse flow depth filter assembly as installed in the pneumatic brake system of a truck.

The inverse flow depth filter assembly of the invention is particularly suitable for use in the pneumatic systems of large trucks and other motor vehicles. A suitable installation is depicted schematically in FIG. 5. Pneumatic systems in large motor vehicles are sometimes used, in part, to release the brakes from engagement. Pressure operated actuating members 80a,b of suitable design are adapted to release the brakes 81a,b and receive pressurized air through supply lines 82a,b, respectively. Air is typically supplied to the system through an ambient air inlet 84 which will typically include a filter for dust and other particulates. The air enters a compressor 86 which raises the pressure of the air to the desired pneumatic system pressure. The compressor 86 is driven by a suitable motor 87. An inverse flow depth filter assembly 88 according to the invention is provided to remove water vapor from the air stream leaving the compressor 86.

Air leaving the compressor 86 will normally be at a temperature between 150-200 degrees F. The heat exchange means of the inverse flow depth filter assembly 88 will cool the air to condense water from the air stream, and will then filter the air to further remove water vapor. An accumulator tank 92 can be provided to store the pressurized air to meet high-demand situations. A pressure sensing means 94 senses system pressure and actuates the motor 87 through a control line 96. The control line 96 activates the motor 87 and compressor 86 to raise system pressure when the pressure drops below a lower pressure set point, and shuts off the motor 87 and compressor 86 when the pressure reaches an upper pressure set point. A pressure line 100 connects the compressor 86 and accumulator tank 92 to the pneumatic supply lines 82a,b.

It is advisable to mount the filter away from the compresser and downstream of the air storage means. This enables the filter to operate on a-ri being used by the elements downstream, rather than merely on air going into storage where the air could pick up water and/or foreign material.

A pressure regulating valve 102 can be provided in the system to release excess pressure which might accumulate. The excess pressure released by the valve 102 can be used to actuate and open the drain valve 20 through a control line 104, which is connected between the valve 102 and the inverse flow depth filter assembly 88. The water which accumulates in the inverse flow depth filter assembly 88 will thereby be drained periodically The invention is capable of taking several different embodiments without departing from the spirit or essential attributes thereof and accordingly, reference should be had to the following claims, rather than to the foregoing specification, as indicating the scope of the invention.

I claim:

1. An inverse flow depth filter assembly with at least one gas permeable filter element, said depth filter assembly comprising:
   an elongated assembly housing with a top, a bottom and walls having an exterior surface and an interior surface defining an open internal cross-section, the assembly housing having gas inlet means and gas egress means communicating with said internal cross-section, the gas inlet means and the gas egress means being disposed adjacent said top, and drain means at said bottom, the top having an underside, the gas inlet means opening into the internal cross-section at a point below a point at which the gas egress means opens into the internal cross-section;
   a filter cartridge comprising a generally hollow filter housing with a gas impermeable material of lesser circumference than said internal cross-section of said assembly housing and including an open, gas permeable cartridge bottom and a cartridge top with a passage leading to the gas egress means, the filter cartridge being suspended from said underside of the top said assembly housing so that a substantially annular channel is defined between said walls of the housing and said impermeable filter housing of the cartridge, a filter material being disposed in the filter housing, the filter material being a non-absorptive fibrous material operable to coalesce droplets from passing gas;
   cartridge receiving means in said top of the assembly housing, including an annular lip for sealing the filter cartridge to the assembly housing between the gas inlet mean sand the gas egress means, such that gas passes from the gas inlet means along the annular channel and through the filter cartridge to the gas egress means, the filter cartridge having a sectional base including continuous upright sections sealed to a collar and forming gas egress ports communicating with the gas egress means, and an annular raised collar sealed to said lip and said upright sections, and sized to form a circumferential seal with said filter housing; and,
   heat exchange means adapted to lower the temperature of passing gas, including a thermally conductive material disposed between the interior surface and the exterior surface of the assembly housing for heat exchange through the assembly housing;
   whereby gas moves through said assembly housing along the path through said inlet means, downward through said annular channel, and upward through said filter cartridge to exit through said gas egress means, said heat exchange means being operable to condense vapor from the gas, vapor droplets and gas through the filter, said droplets and condensates collecting at the bottom of said assembly housing, to be drained from said filter assembly through said drain.

2. The inverse flow depth filter assembly according to claim 1, wherein said cartridge receiving means includes a plug at a top of the filter cartridge, attached to said top of the assembly housing.

3. The inverse flow depth filter assembly according to claim 1, wherein the assembly housing is separable into upper and lower parts, the upper part including the top, said filter cartridge being attached to said top, whereby the filter cartridge is removable with the upper part.

4. The inverse flow depth filter assembly according to claim 1, further comprising drain valve means in communication with said drain means for emptying liquids from the assembly.

5. The filter assembly of claim 1, wherein the filter cartridge is filled with a single kind of filter material.

6. The filter assembly of claim 5, wherein the single kind of filter material is a coalescent material.

7. The inverse flow depth filter assembly according to claim 1, wherein said heat exchange means comprises at least one fin disposed on an outer surface of the assembly housing.

8. The inverse flow depth filter assembly according to claim 7, wherein said heat exchange means includes a plurality of fins extending outwardly from said exterior surface of said walls of said assembly housing.

9. The inverse flow depth filter assembly according to claim 8, wherein two filter materials are included in said filter cartridge, said filter materials being stacked one on top of another, at least an upstream one of said filter materials having a gas permeable coalescent filter element of said non-absorptive fibrous material, and being located below the other of said two filter materials.

10. The inverse flow depth filter assembly according to claim 1, further comprising at least one interior fin on said interior surface of said walls of said assembly housing, for modifying a flow path of gas passing through said filter assembly.

11. The inverse flow depth filter assembly according to claim 10, wherein said at least one interior fin is substantially helical and adapted to channel gas in a substantially helical path downwardly through said annular space, whereby the interior fin maximizes contact between the gas and the assembly housing such that heat transfer is improved and said air flows smoothly through said annular space.

12. A pneumatic system for use in a motor vehicle, comprising:
   means defining an ambient air inlet;
   a compressor connected to the ambient air inlet and adapted to raise air at said ambient air inlet to a system pressure;
   at last one pneumatic supply line connected between said compressor and at least one pneumatically operated component;
   a filter assembly disposed downstream from the compressor and upstream from the component along an air flow direction, the filter assembly including:
      an elongated assembly housing with a top portion, a bottom portion and walls having an exterior surface and an interior surface defining an open internal cross-section, the housing having air inlet means and air egress means communicating with said internal cross-section, the air inlet means and air egress means being disposed adjacent said top portion, and drain means at said bottom portion, the top portion having a top with an underside, the air inlet means opening into the internal cross-section at a point below a point at which the air egress means opens into the internal cross-section;

a filter cartridge disposed in the assembly housing, comprising a generally hollow filter housing with a gas impermeable material of a lesser circumference than said internal cross-section of said assembly housing and including an open, gas permeable cartridge bottom and a cartridge top with a passage leading to the air egress means, the filter cartridge being suspended from said underside of the top so that a substantially annular channel is defined between said walls of the assembly housing and said impermeable filter housing of the cartridge, a filter material being disposed in the filter housing, the filter material being a non-absorptive fibrous material operable to coalesce droplets from passing gas;

cartridge receiving means in said top portion of the assembly housing for holding the filter cartridge in place, including an annular lip sealing the filter cartridge to the assembly housing between the air inlet means and the air egress means, the filter cartridge having a sectional base including continuous upright sections sealed to a collar and forming air egress ports communicating with the air egress means, and an annular raised collar sealed to said lip and said upright sections, and sized to form a circumferential seal with said assembly housing; and, heat exchange means on at least one of said exterior surface and said interior surface of said walls of said housing for heat exchange with the assembly housing;

whereby air moves through said assembly housing along a path through said inlet means, downward through said annular channel, and upward through said filter cartridge to exit through said air egress means, said heat exchange means being operable to condense vapor from the air, vapor droplets and condensates falling in a direction opposite to the flow of the air through the filter, said droplets and condensates collecting at said housing bottom, to be drained from said assembly through said drain.

13. The pneumatic system according to claim 12, wherein said cartridge receiving means includes a plug at a top of the filter cartridge, attachable to said top portion of the assembly housing.

14. The a pneumatic system according to claim 12, wherein said filter cartridge is attached to said assembly housing top and the assembly housing top is disengageable with respect to said housing bottom such that the filter cartridge is removable with the assembly housing top.

15. The pneumatic system according to claim 12, further comprising drain valve means in communication with said drain means for emptying liquids from the assembly.

16. The pneumatic system according to claim 12, further comprising at least one substantially helical fin on said interior surface of said assembly housing for modifying flow of air through the assembly housing, the helical fin being said air in a substantially helical path downwardly through said annular space and maximizing contact between the air and the assembly housing, whereby heat transfer is increased and said air flows smoothly downward through said annular space.

17. The pneumatic system according to claim 12, comprising at least one fin disposed on the exterior surface of the assembly housing for heat exchange with outside air.

18. The pneumatic system according to claim 16, comprising a plurality of fins extending laterally outward from an exterior surface of said assembly housing.

19. The pneumatic system according to claim 18, wherein two filter materials are included in said filter cartridge, said filter materials being stacked on one another, at least an upstream one of said filter materials along the air flow path having a gas permeable coalescent filter element of said non-absorptive fibrous material, and being located below the other of said two filter materials.

20. A pneumatic system for use in a motor vehicle, comprising:

means defining an ambient air inlet;

a compressor connected to the ambient air inlet and adapted to raise air at said ambient air inlet to a system pressure;

at least one pneumatic supply line connected between said compressor and at least one pneumatically operated component;

a filter assembly disposed downstream from the compressor and upstream from the component along an air flow direction, the filter assembly including:

an elongated assembly housing with a top portion, a bottom portion and walls having an exterior surface and an interior surface defining an open internal cross-section, the housing having air inlet means and air egress means communicating with said internal cross-section, the air inlet means and air egress means being disposed adjacent a top of said top portion, and drain means at said bottom portion, the top of the top portion having an underside, the air inlet means opening into the internal cross-section at a point below a point at which the air egress means opens into the internal cross-section;

a filter cartridge disposed in the assembly housing, comprising a generally hollow filter housing with a gas impermeable material of a lesser circumference than said internal cross-section of said assembly housing and including an open, gas permeable cartridge bottom and a cartridge top with a passage leading to the air egress means, the filter cartridge being connected to said underside of the top so that a substantially annular channel is defined between said walls of the assembly housing and said impermeable filter housing of the cartridge, a filter material being disposed in the filter housing, the filter material being a non-absorptive fibrous material operable to coalesce droplets from passing gas;

heating means in thermal contact with the assembly housing, for preventing the freezing of droplets and condensates collected at a drain valve at the bottom portion of said assembly housing; and, heat exchange means on at least one of said exterior surface and said interior surface of said walls of said assembly housing.

21. A pneumatic system for use in a motor vehicle, comprising:

means defining an ambient air inlet;

a compressor connected to the ambient air inlet and adapted to raise air at said ambient air inlet to a system pressure;

at least one pneumatic supply line connected between said compressor and at least one pneumatically operated component;

a filter assembly disposed downstream from the compressor and upstream from the component along an air flow direction, the filter assembly including:

an elongated assembly housing with a top portion, a bottom portion and walls having an exterior surface and an interior surface defining an open internal cross-section, the housing having air inlet means and air egress means communicating with said internal cross-section, the air inlet means and air egress mean being disposed adjacent a top of said top portion, and drain means at said bottom portion, the top of the top portion having an underside, the air inlet means opening into the internal cross-section at a point below a point at which the air egress means opens into the internal cross-section;

a filter cartridge connected to the top portion, comprising a generally hollow filter housing with a gas impermeable material of a lesser circumference than said internal cross-section of said assembly housing and including an open, gas permeable cartridge bottom and a cartridge top with a passage leading to the air egress means, the filter cartridge being suspended from said underside of the top portion of said assembly housing so that a substantially annular channel is defined between said walls of the assembly housing and said impermeable filter housing of the cartridge, a filter material being disposed in the filter housing, the filter material being a non-absorptive fibrous material operable to coalesce droplets from passing gas;

means for sensing pressure in said pneumatic system, and outlet means responsive to said sensing means adapted to provide pressure relief when said system pressure reaches an upper limit, said outlet means being pneumatically connected to said drain means of said assembly housing and being operable to release water via said drain means when said pressure is relieved.

22. An inverse flow depth filter assembly with at least one gas permeable filter element, said depth filter assembly comprising:

an elongated assembly housing with a top portion, a bottom portion and walls having an exterior surface and an interior surface defining an open internal cross-section, the assembly housing having gas inlet means and gas egress means communicating with said internal cross-section, the gas inlet means and the gas egress means being disposed adjacent a top of said top portion, and drain means at said bottom portion, the top having an underside;

a filter cartridge received in the assembly housing, comprising a generally hollow filter housing with a gas impermeable material of a lesser circumference than said internal cross-section of said assembly housing and including an open, gas permeable cartridge bottom and a cartridge top with a passage leading to the gas egress means, the filter cartridge being suspended from said underside of the top so that a substantially annular channel communicating with the gas inlet means is defined between said walls of the assembly housing and said impermeable filter housing of the cartridge, a filter material being disposed in the filter housing, the filter material including a non-absorptive fibrous material operable to coalesce droplets from passing gas;

heat exchange means providing a thermally conductive path between the exterior and interior surface of the assembly housing, adapted to lower the temperature of passing gas; and, heating means in thermally conductive contact with the bottom portion of the assembly housing, for preventing the freezing of droplets and condensates at a valve at said bottom portion for draining the assembly housing.

23. A motor vehicle comprising:

a motor vehicle chassis movable over the ground;

a pneumatic system mounted on the motor vehicle chassis with means defining an ambient air inlet, a compressor connected to the ambient air inlet and adapted to raise air at said ambient air inlet to a system pressure, and at least one pneumatic supply line connected between said compressor and at least one pneumatically operated component of said motor vehicle;

a filter assembly comprising an assembly housing with a top portion, a bottom portion and walls having an exterior surface and interior surface defining an open internal cross-section, the housing having gas inlet means and gas egress means communicating with the internal cross-section adjacent a top of said top portion, and drain means at said bottom portion, the top having an underside, the gas inlet means opening into the internal cross-section at a point below a point at which the gas egress means opens into the internal cross-section;

the filter assembly comprising a filter cartridge fixed within said assembly housing at the top and including an impermeable hollow shell with a non-absorptive fibrous filter material therein, operable to coalesce droplets from gas passing through said assembly housing from said gas inlet means to said gas egress means; and, the filter assembly further comprising cartridge receiving means in said top portion of the assembly housing, including an annular lip sealing the filter cartridge to the assembly housing between the gas inlet and the gas egress means along the annular channel and through the filter cartridge to the gas egress means, the filter cartridge having a sectional base including continuous upright sections sealed to a collar and forming gas egress ports communicating with the gas egress means, and an annular raised collar sealed to said lip and said upright sections, and sized to form a circumferential seal with said filter housing.

24. The motor vehicle of claim 23, further comprising means for sensing pressure in said pneumatic system and a valve connected to the drain mans of the assembly housing, the valve being controlled by the means for sensing pressure, to open the valve connected to the drain means in the assembly housing when said system pressure reaches an upper limit, said outlet means being pneumatically connected to said valve.

25. The motor vehicle of claim 24, further comprising a heat exchange means on the assembly housing, comprising at least one fin.

* * * * *